US012337606B2

(12) United States Patent
Minami

(10) Patent No.: US 12,337,606 B2
(45) Date of Patent: Jun. 24, 2025

(54) PRINTER, PRINTING METHOD, AND COMPUTER READABLE MEDIUM

(71) Applicant: BROTHER KOGYO KABUSHIKI KAISHA, Nagoya (JP)

(72) Inventor: Akira Minami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 206 days.

(21) Appl. No.: 18/332,692

(22) Filed: Jun. 9, 2023

(65) Prior Publication Data

US 2023/0398791 A1 Dec. 14, 2023

(30) Foreign Application Priority Data

Jun. 10, 2022 (JP) ................................ 2022-094402

(51) Int. Cl.
*B41J 2/355* (2006.01)
*B41J 11/00* (2006.01)

(52) U.S. Cl.
CPC ............ *B41J 2/355* (2013.01); *B41J 11/007* (2013.01)

(58) Field of Classification Search
CPC ... B41J 2/355; B41J 2/36; B41J 11/007; B41J 2/32; B41J 2/35; B41J 2/3551; B41J 2/3553; B41J 2/3555; B41J 2/3556; B41J 2/3558
See application file for complete search history.

(56) References Cited

U.S. PATENT DOCUMENTS

2019/0291493 A1* 9/2019 Fisher ...................... B41M 5/42
2021/0141328 A1 5/2021 Sasaki et al.

FOREIGN PATENT DOCUMENTS

JP 2008-6830 A 1/2008
JP 2019-214206 A 12/2019
JP 2021120211 * 8/2021 .............. B41J 2/355
WO 02/096665 A1 12/2002
WO WO-2021153682 A1 * 8/2021 ................ B41J 2/32

* cited by examiner

*Primary Examiner* — Kristal Feggins
(74) *Attorney, Agent, or Firm* — KENEALY VAIDYA LLP

(57) ABSTRACT

A printer includes a conveyance unit configured to convey a heat sensitive medium in a conveyance direction, a thermal head including a plurality of heat generating elements arranged in a direction crossing the conveyance direction, and configured to perform printing on the heat sensitive medium conveyed by the conveyance unit by heat generation of the plurality of heat generating elements, a controller configured to selectively cause the plurality of heat generating elements to generate heat by performing application control of energy to the heat generating element so as to print a dot on the heat sensitive medium by the heat generating elements, and a storage unit configured to store three or more heating patterns of the heat generating elements in the application control. The controller includes a first output unit and a second output unit.

8 Claims, 9 Drawing Sheets

FIG. 4

| HEATING PATTERN TABLE | | | | |
|---|---|---|---|---|
| HEATING PATTERN | SWITCHING DATA | | | |
| | CU11 (T1) | CU12 (T2) | CU21 (T3) | CU22 (T4) |
| HEATING PATTERN OF FIRST COLOR | 1 | 1 | 0 | 0 |
| HEATING PATTERN OF SECOND COLOR | 0 | 0 | 1 | 1 |
| HEATING PATTERN OF MIXED COLOR | 1 | 1 | 1 | 1 |
| HEATING PATTERN OF BASE MATERIAL COLOR | 0 | 0 | 0 | 0 |

FIG. 9

| HEATING PATTERN TABLE | | | | |
|---|---|---|---|---|
| HEATING PATTERN | SWITCHING DATA | | | |
| | CU11 (T1) | CU12 (T2) | CU21 (T3) | CU22 (T4) |
| HEATING PATTERN OF FIRST SIZE | 1 | 1 | 0 | 0 |
| HEATING PATTERN OF SECOND SIZE | 0 | 0 | 1 | 1 |
| HEATING PATTERN OF BASE MATERIAL COLOR | 0 | 0 | 0 | 0 |

PRINTER, PRINTING METHOD, AND COMPUTER READABLE MEDIUM

REFERENCE TO RELATED APPLICATIONS

This application claims priority from Japanese Patent Application No. 2022-094402 filed on Jun. 10, 2022. The entire content of the priority application is incorporated herein by reference.

BACKGROUND ART

There is a printer that performs printing on a heat sensitive medium by causing a thermal head to generate heat. For example, an image forming apparatus described in a related art sends a signal to a resistor during a given heating time. Accordingly, the image forming apparatus prints dots by causing the resistor to generate heat and the heat sensitive medium to develop a color. In the image forming apparatus, in order to control the heat generation of the resistor with good responsiveness, a controller performs data transfer for outputting the signal to the resistor in a relatively short period of time such as 10 μsec.

DESCRIPTION

In the image forming apparatus, in order to reduce a control load of the controller, the number of data transfers per unit time may be reduced. In this case, it becomes difficult to control the heat generation of the resistor with good responsiveness, that is, it becomes difficult to keep a temperature of the resistor constant in a state in which the resistor generates the heat. When the temperature of the resistor varies, a color development range of the heat sensitive medium may vary. For this reason, there is a possibility that a size of the dots actually printed on the heat sensitive medium may vary with respect to a target size.

An object of the present invention is to provide a printer, a printing method, and a printing program which contribute to an advantage of preventing a variation in size of a dot to be actually printed on a heat sensitive medium with respect to a target size while preventing a control load of a controller.

According to a first aspect of the present invention, a printer includes a conveyance unit configured to convey a heat sensitive medium in a conveyance direction, a thermal head including a plurality of heat generating elements arranged in a direction crossing the conveyance direction, and configured to perform printing on the heat sensitive medium conveyed by the conveyance unit by heat generation of the plurality of heat generating elements, a controller configured to selectively cause the plurality of heat generating elements to generate heat by performing, for each of the heat generating elements, application control of energy to the heat generating element so as to print a dot on the heat sensitive medium by the heat generating elements, and a storage unit configured to store three or more heating patterns of the heat generating elements in the application control. The controller includes a first output unit configured to output, in the application control, a strobe signal in which a plurality of chopping units formed by repeating a given chopping cycle are arranged over time, the chopping cycle including a first period during which an application state in which the energy is applied to the heat generating element or a non-application state in which the energy is not applied to the heat generating element is set, and a second period during which the non-application state is set, and a second output unit configured to output switching data corresponding to each of the plurality of heat generating elements for each of the chopping units in the strobe signal output by the first output unit in the application control, the switching data specifying, for each of the chopping units, whether to set the first period to the application state or the non-application state. The heating pattern indicates, for one of the heat generating elements, a combination of the switching data which is to be output by the second output unit and respectively set the first periods to the application state or the non-application state, for each of the plurality of chopping units in the strobe signal output by the first output unit in the application control, and the second output unit outputs, based on image data, the switching data corresponding to one of the three or more heating patterns stored in the storage unit for each of the plurality of heat generating elements.

According to the first aspect, the application control is performed by the combination of the strobe signal and the switching data. Since the chopping units are arranged over time in the strobe signal, the application state and the non-application state are switched between the output of one switching data and the output of the next switching data. Therefore, responsiveness of the heat generation of the heat generating element is improved as compared with a case in which the application state and the non-application state are switched each time the switching data is output. That is, the printer contributes to an advantage of improving the responsiveness of the heat generating element R without shortening an output interval of the switching data. Accordingly, the printer contributes to an advantage of preventing a variation in size of the dot actually printed on the heat sensitive medium with respect to a target size while preventing a control load of the second output unit.

According to a second aspect of the invention, a printing method performed by a printer including a conveyance unit configured to convey a heat sensitive medium in a conveyance direction, a thermal head including a plurality of heat generating elements arranged in a direction crossing the conveyance direction, and configured to perform printing on the heat sensitive medium conveyed by the conveyance unit by heat generation of the plurality of heat generating elements, and a storage unit configured to store three or more heating patterns of the heat generating elements in application control of energy to the heat generating elements for printing a dot on the heat sensitive medium by the heat generating elements, includes selectively causing the plurality of heat generating elements to generate heat by performing the application control for each of the heat generating elements. The causing includes outputting a strobe signal in which a plurality of chopping units formed by repeating a given chopping cycle are arranged over time in the application control, the chopping cycle including a first period during which an application state in which the energy is applied to the heat generating element or a non-application state in which the energy is not applied to the heat generating element is set, and a second period during which the non-application state is set, and further outputting switching data corresponding to each of the plurality of heat generating elements for each of the chopping units in the strobe signal output by the other outputting in the application control, the switching data specifying, for each of the chopping units, whether to set the first period to the application state or the non-application state. The heating pattern indicates, for one of the heat generating elements, a combination of the switching data which is to be output by the further outputting and respectively set the first periods to the application state or the non-application state, for each of the plurality of chopping units in the strobe signal output by the other outputting in the application control, and the second output process outputs, based on image data, the switching data corresponding to one of the three or more heating patterns stored in the storage unit for each of the plurality of heat generating elements. The second aspect contributes to the same advantages as those of the first aspect.

According to a third aspect of the invention, a non-transitory computer readable medium stores a program causing a computer of a printer to execute a process. The printer includes a conveyance unit configured to convey a heat sensitive medium in a conveyance direction, a thermal head including a plurality of heat generating elements arranged in a direction crossing the conveyance direction, and configured to perform printing on the heat sensitive medium conveyed by the conveyance unit by heat generation of the plurality of heat generating elements, and a storage unit configured to store three or more heating patterns of the heat generating elements in application control of energy to the heat generating elements for printing a dot on the heat sensitive medium by the heat generating elements. The process includes selectively causing the plurality of heat generating elements to generate heat by performing the application control for each of the heat generating elements. The causing includes outputting a strobe signal in which a plurality of chopping units formed by repeating a given chopping cycle are arranged over time in the application control, the chopping cycle including a first period during which an application state in which the energy is applied to the heat generating element or a non-application state in which the energy is not applied to the heat generating element is set, and a second period during which the non-application state is set, and further outputting switching data corresponding to each of the plurality of heat generating elements for each of the chopping units in the strobe signal output by the other outputting in the application control, the switching data specifying, for each of the chopping units, whether to set the first period to the application state or the non-application state. The heating pattern indicates, for one of the heat generating elements, a combination of the switching data which is to be output by the further outputting and respectively set the first periods to the application state or the non-application state, for each of the plurality of chopping units in the strobe signal output by the other outputting in the application control, and the second output process outputs, based on image data, the switching data corresponding to one of the three or more heating patterns stored in the storage unit for each of the plurality of heat generating elements. The third aspect contributes to the same advantages as those of the first aspect.

FIG. 4 is a diagram showing a heating pattern table.

FIG. 9 is a diagram showing a heating pattern table according to a modification.

Figure 1:
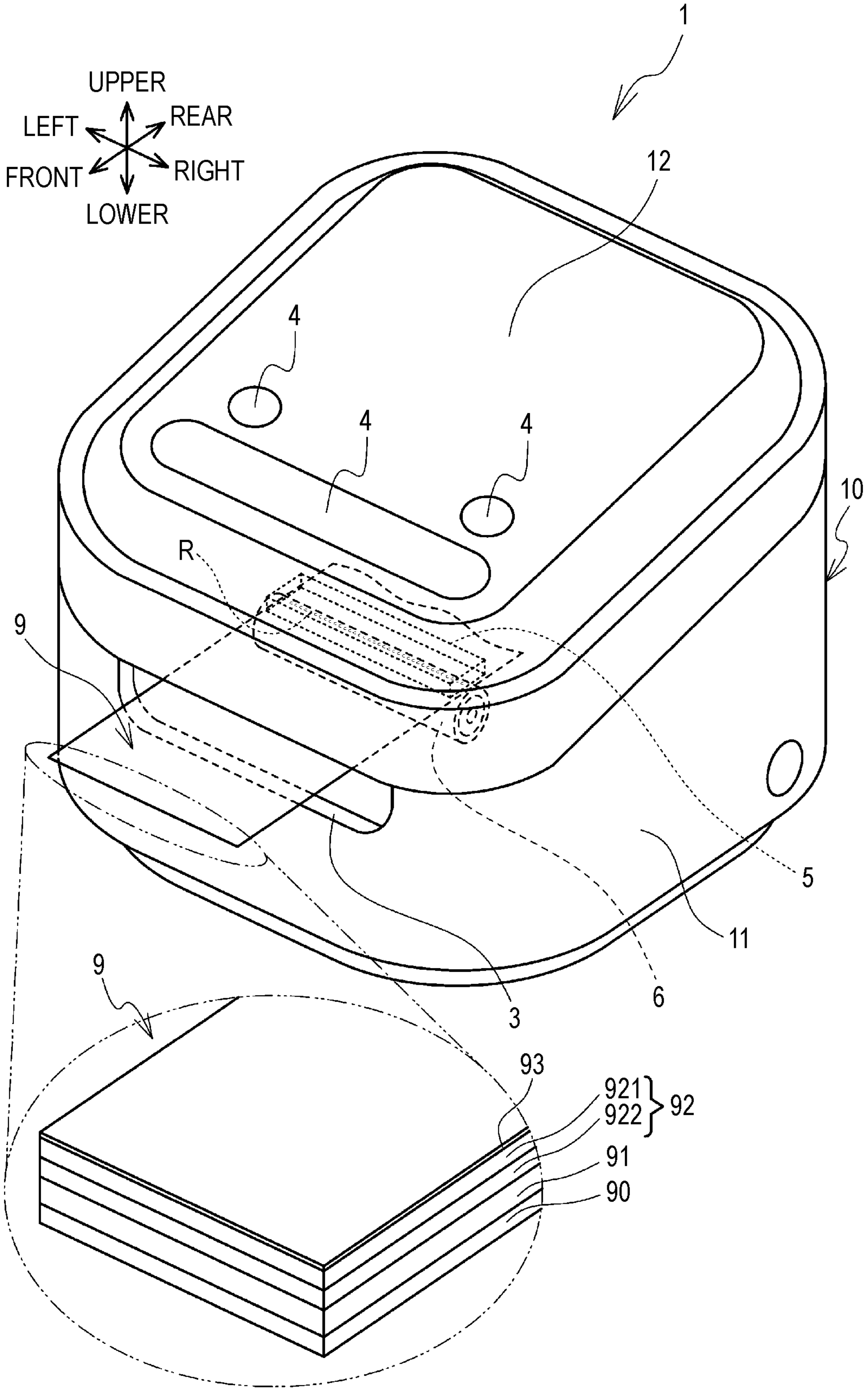
FIG. 1 is a perspective view showing a printer 1.

Hereinafter, an embodiment embodying the present invention will be described with reference to the drawings. The drawings to be referred to are used to describe technical features that the present invention may employ, and a configuration, control, and the like of a device described in the drawings are merely illustrative examples, and are not intended to limit the scope of the invention. In the following description, a lower left side, an upper right side, a lower right side, an upper left side, an upper side, and a lower side in FIG. 1 are respectively referred to as a front side, a rear side, a right side, a left side, an upper side, and a lower side of a printer 1 and a heat sensitive tape 9.

The printer 1 will be described with reference to FIG. 1. The printer 1 is a heat sensitive-type tape printer, and prints an image on the heat sensitive tape 9. The heat sensitive tape 9 is a type of heat sensitive medium. In the present embodiment, "printing" means that a color developing layer 92 to be described later develops a color. The printer 1 includes a housing 10. The housing 10 has a box shape and includes a lower case 11 and a lid 12. The lower case 11 opens upward. The lid 12 is opened and closed with respect to the lower case 11. FIG. 1 shows a state in which the lid 12 is closed with respect to the lower case 11.

A discharge port 3 is provided on a front surface of the housing 10. The discharge port 3 discharges the printed heat sensitive tape 9 out of the housing 10. A plurality of operation switches 4 are provided on an upper surface of the housing 10. A user inputs various kind of information to the printer 1 by operating the operation switches 4.

A mounting portion (not shown), a platen roller 6, and a thermal head 5 are provided in the housing 10. In FIG. 1, the platen roller 6 and the thermal head 5 hidden by the housing 10 are indicated by imaginary lines. The mounting portion is recessed downward from an upper surface of the lower case 11. The heat sensitive tape 9 is mounted on the mounting portion. In the present embodiment, in a state in which the heat sensitive tape 9 is accommodated in a tape cassette (not shown), the tape cassette is mounted on the mounting portion.

The platen roller 6 is located behind the discharge port 3 and extends in a left-right direction. The platen roller 6 rotates to convey the heat sensitive tape 9 from the mounting portion toward the discharge port 3. Therefore, in the present embodiment, a front-rear direction is a conveyance direction.

The thermal head 5 has a plate shape and faces the platen roller 6 from above. The thermal head 5 sandwiches the heat sensitive tape 9 with the platen roller 6 in a state in which a thickness direction of the heat sensitive tape 9 coincides with an upper-lower direction of the printer 1.

The thermal head 5 includes a plurality of heat generating elements R. The plurality of heat generating elements R are arranged in the left-right direction on a lower surface of the thermal head 5. That is, a direction (left-right direction) in which the plurality of heat generating elements R are arranged is orthogonal to the conveyance direction (front-rear direction). The plurality of heat generating elements R perform printing on the heat sensitive tape 9 by generating heat.

The heat sensitive tape 9 will be described with reference to an enlarged view of FIG. 1. The heat sensitive tape 9 has an elongated shape, and is formed by stacking a plurality of layers. In the enlarged view of FIG. 1, in order to facilitate understanding, a thickness of each of layers of the heat sensitive tape 9 and a magnitude relationship between the thicknesses of the layers are schematically shown, and the actual thickness of each of the layers and the magnitude relationship between the thicknesses of the layers may differ from those in FIG. 1.

The heat sensitive tape 9 includes a release paper 90, a base material 91, a plurality of the color developing layers 92, and an overcoat layer 93. In the present embodiment, the plurality of color developing layers 92 include a first color developing layer 921 and a second color developing layer 922. The release paper 90, the base material 91, the second color developing layer 922, the first color developing layer 921, and the overcoat layer 93 are stacked in this order from a lower side of the heat sensitive tape 9 in the thickness direction of the heat sensitive tape 9.

The base material 91 is a resin film and has a base material color. The base material color is not limited to a specific color, and is white in the present embodiment. The base material color is different from any of colors (in the present embodiment, a first color, a second color, and a third color to be described later) which are developed by the plurality of color developing layers 92. An adhesive surface is formed on a lower surface of the base material 91.

The release paper 90 is provided on the lower surface (adhesive surface) of the base material 91, and may be releasable from the base material 91. After the printing is performed on the heat sensitive tape 9, the user may release the release paper 90 from the base material 91 and attach the printed heat sensitive tape 9 to a desired location via an adhesive surface. The overcoat layer 93 has a visible light transmission property and protects the plurality of color developing layers 92.

Each of the plurality of color developing layers 92 has a visible light transmission property, and is heated to a color developing temperature of the respective one of the layers, and thereby develops a respective color of the layers. In order to form the plurality of color developing layers 92, for example, chemicals described in JP2008-6830A are used.

The first color developing layer 921 develops the first color when the temperature of the first color developing layer 921 exceeds a first temperature. That is, the first color is a color which is developed by an uppermost layer. The first color is not limited to a specific color, and is, for example, yellow.

The second color developing layer 922 develops the second color when the temperature of the second color developing layer 922 exceeds a second temperature. That is, the second color is a color which is developed by an intermediate layer. The second temperature is lower than the first temperature. The second color is not limited to a specific color, and is a color different from the first color, and is, for example, magenta.

In a case in which one dot is printed on the heat sensitive tape 9, when the plurality of color developing layers 92 develop colors, one dot has a mixed color. In the present embodiment, the mixed color is a mixed color of the first color and the second color. In the present embodiment, the mixed color of the first color and the second color is simply referred to as the "mixed color".

A printing operation on the heat sensitive tape 9 performed by the printer 1 will be described. In the printing operation, the platen roller 6 rotates counterclockwise in a right side view to convey the heat sensitive tape 9 from a rear side to a front side. The heat sensitive tape 9 is pressed against the thermal head 5 by the platen roller 6 while passing between the thermal head 5 and the platen roller 6. Specifically, the platen roller 6 comes into contact with the heat sensitive tape 9 from the release paper 90 side, and the thermal head 5 comes into contact with the heat sensitive tape 9 from the overcoat layer 93 side.

In this state, a voltage is selectively applied to each of the plurality of heat generating elements R. Power is supplied to the heat generating element R to which the voltage is applied by energization. The heat generating element R to which the power is supplied generates the heat to heat the heat sensitive tape 9 conveyed by the platen roller 6 from the first color developing layer 921 side in a stacking direction. Accordingly, dots are printed at heated positions in the heat sensitive tape 9.

In the following description, when the plurality of heat generating elements R are energized for one printing cycle, a line of dots printed on the heat sensitive tape 9 by the plurality of heat generating elements R is referred to as a "print line". The one printing cycle is a period in which each of the plurality of heat generating elements R may be energized in order to print one print line on the heat sensitive tape 9 by the plurality of heat generating elements R. Since the plurality of heat generating elements R are arranged in the left-right direction, the print line extends in the left-right direction. Hereinafter, in one printing cycle, control in which energy is applied to the heat generating element R in order to print the dots on the heat sensitive tape 9 by the heat generating elements R is referred to as "application control".

The printer 1 prints a plurality of print lines on the heat sensitive tape 9 along the conveyance direction by repeating the printing of the print line on the heat sensitive tape 9 while conveying the heat sensitive tape 9 (that is, the energization of the heat generating element R for one printing cycle and the application control to the plurality of heat generating elements R). The platen roller 6 further rotates to discharge the printed heat sensitive tape 9 from the discharge port 3 to an outside of the housing 10.

Figure 2:
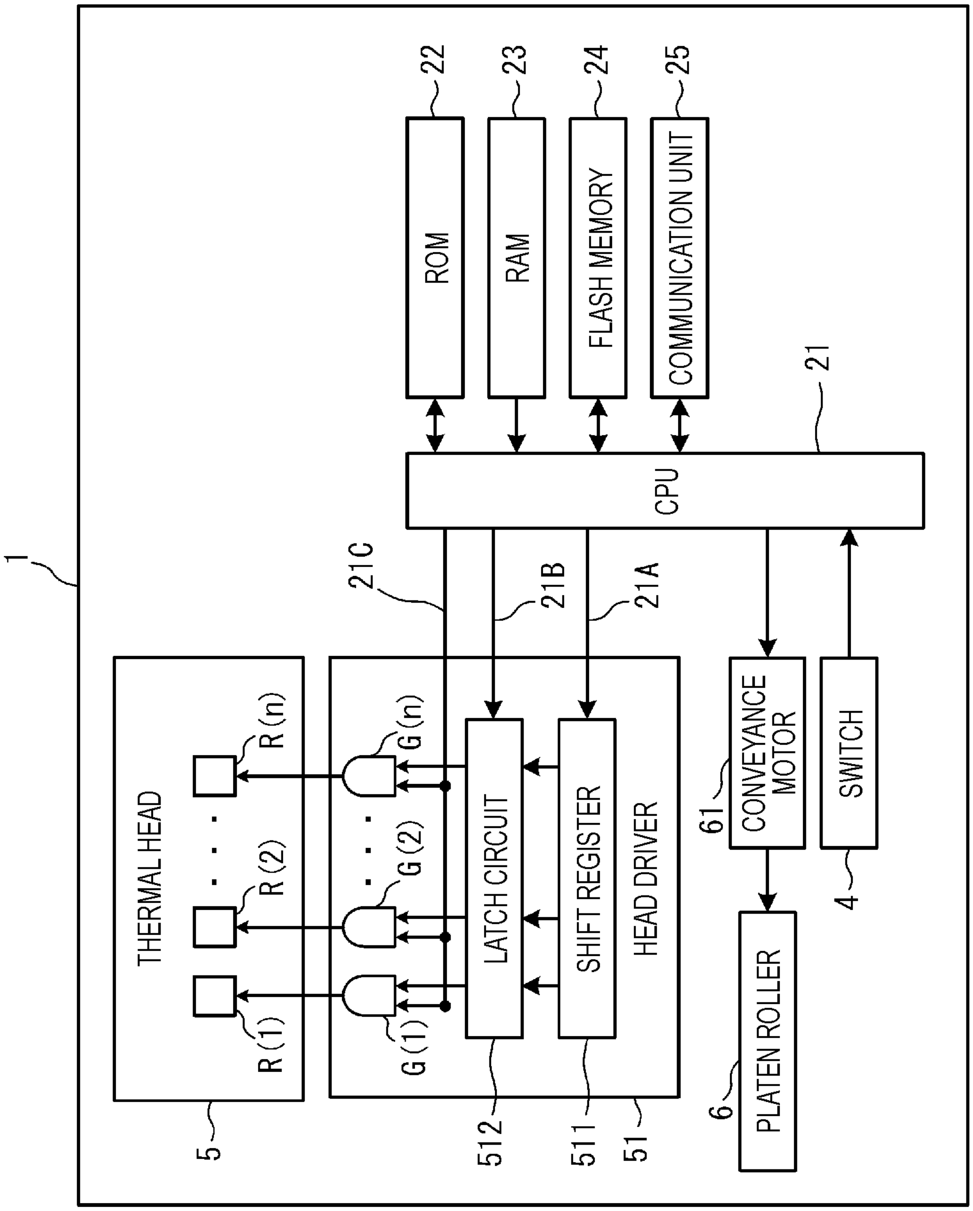
FIG. 2 is a block diagram showing an electrical configuration of the printer 1.

An electrical configuration of the printer 1 will be described with reference to FIG. 2. The printer 1 includes a CPU 21. The CPU 21 controls the printer 1 and functions as a processor. A ROM 22, a RAM 23, a flash memory 24, a communication unit 25, the operation switches 4, a conveyance motor 61, and a head driver 51 are electrically connected to the CPU 21.

The ROM 22 stores various programs which are executed by the CPU 21, various parameters required when the CPU 21 executes the various programs, and the like. The ROM 22 stores, for example, a program for executing a main process (see FIG. 8), which will be described later, and a heating pattern table (see FIG. 4) which will be described later. The RAM 23 temporarily stores various data when the CPU 21 executes the various programs. The flash memory 24 is a non-volatile storage device and stores, for example, image data.

The communication unit 25 is, for example, a wireless LAN interface, a wired LAN interface, or a USB interface, and performs communication by being connected to an external terminal (not shown). The external terminal is a personal computer, a mobile terminal, a memory card read device, or the like. The conveyance motor 61 is coupled to the platen roller 6 and is driven based on a signal output from the CPU 21. The conveyance motor 61 is driven to rotate the platen roller 6.

The head driver 51 drives the thermal head 5 based on the signal output from the CPU 21 and selectively causes the plurality of heat generating elements R to generate the heat. Although the head driver 51 is not limited to a specific circuit configuration, in the present embodiment, the head driver 51 includes a shift register 511, a latch circuit 512, and a plurality of AND gates G(1) to G(n).

The shift register 511 is connected to the CPU 21 via a signal line 21A. The latch circuit 512 is connected to the CPU 21 via a signal line 21B. The plurality of AND gates G(1) to G(n) correspond to a plurality of heat generating elements R(1) to R(n), respectively. A first input terminal of each of the AND gates G(1) to G(n) is connected to the latch circuit 512. A second input terminal of each of the AND gates G(1) to G(n) is connected to the CPU 21 via a signal line 21C. An output terminal of each of the AND gates G(1) to G(n) is connected to a corresponding one of the heat generating elements R(1) to R(n).

The shift register 511 sequentially receives switching data transmitted as serial data from the CPU 21. Details of the switching data will be described later. The shift register 511 converts the switching data sequentially received as the serial data into parallel data. The shift register 511 holds the switching data converted into the parallel data in association with the respective one of the heat generating elements R(1) to R(n). The shift register 511 outputs the switching data converted to the parallel data to the latch circuit 512 by a clock signal.

The latch circuit 512 holds each switching data received from the shift register 511 in a state associated with the respective one of the heat generating elements R(1) to R(n). The latch circuit 512 outputs each of the held switching data to the corresponding one of the AND gates G(1) to G(n) by a latch signal. Each switching data is input from the latch circuit 512 to the first input terminal of each of the AND gates G(1) to G(n). A strobe signal STB is input from the CPU 21 to the second input terminal of each of the AND gates G(1) to G(n). Each of the AND gates G(1) to G(n) controls heat generation (energization) of the corresponding one of the heat generating elements R(1) to R(n) based on the switching data and the strobe signal STB in the application control. In this way, the application control is performed for each heat generating element R. Accordingly, the plurality of heat generating elements R(1) to R(n) selectively generate the heat.

Figure 3:
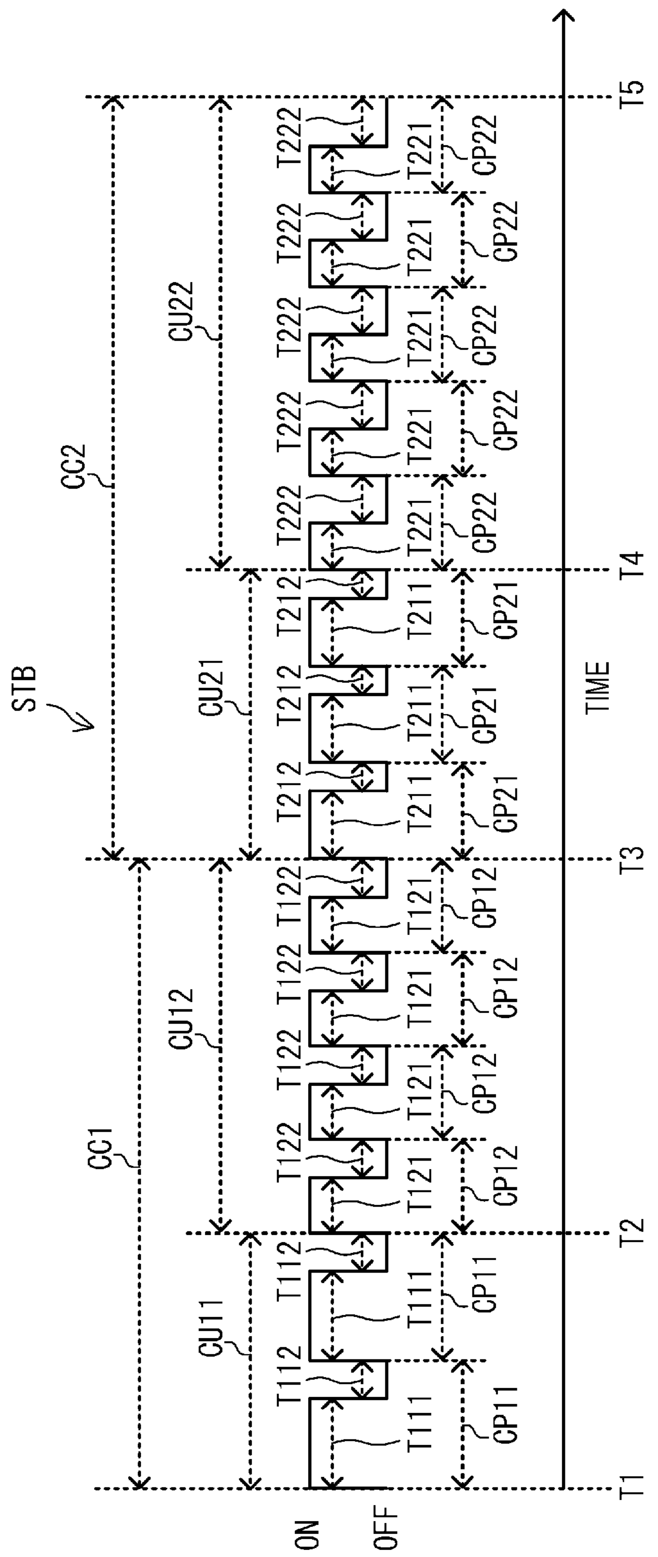
FIG. 3 is a timing chart showing a strobe signal STB.

The strobe signal STB will be described with reference to FIG. 3. The strobe signal STB is formed by repeating a plurality of chopping units a plurality of times in one printing cycle. Hereinafter, the strobe signal STB in one printing cycle is simply referred to as the "strobe signal STB" unless otherwise specified. In the present embodiment, the switching data to be described later is output for each chopping unit in the strobe signal STB. That is, the chopping unit is a unit of a plurality of chopping cycles in which the switching data to be described later is output among the chopping cycles repeated a plurality of times in one printing cycle.

The chopping unit is formed by repeating one or more chopping cycles. The chopping cycle includes a first period and a second period. The first period is a period in which the strobe signal STB indicates "ON" (high level). The second period is a period in which the strobe signal STB indicates "OFF" (low level). When the strobe signal STB indicates "ON" (first period), whether or not to energize the heat generating element R is switched according to the switching data to be described later. When the strobe signal STB indicates "OFF" (second period), the heat generating element R is not energized regardless of the switching data to be described later.

In the present embodiment, the strobe signal STB is configured such that a plurality of chopping units CU11, CU12, CU21, and CU22 are arranged in this order over time. The term "over time" means "from T1 to T5". The chopping unit CU11 is formed by repeating a chopping cycle CP11 twice. The chopping cycle CP11 includes a first period T111 and a second period T112. The chopping unit CU12 is formed by repeating a chopping cycle CP12 four times. The chopping cycle CP12 includes a first period T121 and a second period T122.

The chopping unit CU21 is formed by repeating a chopping cycle CP21 three times. The chopping cycle CP21 includes a first period T211 and a second period T212. A chopping unit CU22 is formed by repeating a chopping cycle CP22 five times. The chopping cycle CP22 includes a first period T221 and a second period T222.

Hereinafter, a plurality of chopping units in which ratios of lengths of the first periods to lengths of the chopping cycles are arranged in a descending order over time and lengths of the chopping units are arranged in an ascending order over time are referred to as a "chopping cluster".

A ratio (T121/CP12) of a length of the first period T121 to a length of the chopping cycle CP12 is smaller than a ratio (T111/CP11) of a length of the first period T111 to a length of the chopping cycle CP11. Therefore, in the present embodiment, the chopping units CU11 and CU12 are configured such that the first periods with respect to the lengths of the plurality of chopping cycles constituting the respective one of the chopping units CU11 and CU12 are arranged in the descending order over time. A length of the chopping unit CU12 (length from T2 to T3) is larger than a length of the chopping unit CU11 (length from T1 to T2). Therefore, in the present embodiment, the lengths of the chopping units CU11 and CU12 are arranged in the ascending order over time. Therefore, in the present embodiment, the chopping units CU11 and CU12 constitute a chopping cluster CC1.

A ratio (T221/CP22) of a length of the first period T221 to a length of the chopping cycle CP22 is smaller than a ratio (T211/CP21) of a length of the first period T211 to a length of the chopping cycle CP21. Therefore, in the present embodiment, the chopping units CU21 and CU22 are configured such that the first periods with respect to the lengths of the plurality of chopping cycles constituting the respective one of the chopping units CU11 and CU12 are arranged in the descending order over time. A length of the chopping unit CU22 (length from T4 to T5) is larger than a length of the chopping unit CU21 (length from T3 to T4). Therefore, in the present embodiment, the lengths of the chopping units CU21 and CU22 are arranged in the ascending order over time. Therefore, in the present embodiment, the chopping units CU21 and CU22 constitute a chopping cluster CC2.

As described above, the strobe signal STB is formed such that the plurality of chopping clusters CC1 and CC2 are arranged in this order over time. The ratio (T211/CP21) of the length of the first period T211 to the length of the chopping cycle CP21 is larger than the ratio (T121/CP12) of the length of the first period T121 to the length of the chopping cycle CP12. Therefore, in the present embodiment, the chopping units CU12 and CU21 are configured such that the first periods with respect to the lengths of the plurality of chopping cycles respectively constituting the chopping units CU12 and CU21 are arranged in the ascending order over time. The length of the chopping unit CU21 (length from T3 to T4) is smaller than the length of the chopping unit CU12 (length from T2 to T4). Therefore, in the present embodiment, the lengths of the chopping units CU12 and CU21 are arranged in the descending order over time. Therefore, the chopping units CU12 and CU21 do not constitute the chopping cluster.

Furthermore, in the present embodiment, the length of the first period T211 is smaller than the length of the first period T111. The length of the first period T221 is smaller than the length of the first period T121. The length of the chopping unit CU21 is larger than the length of the chopping unit CU11. The length of the chopping unit CU22 is larger than the length of the chopping unit CU12. A length of the chopping cluster CC2 is larger than a length of the chopping cluster CC1. A ratio ((T211×3+T221×5)/CC2) of a total length of the first periods T211 and T221 to the length of the chopping cluster CC2 is smaller than a ratio ((T111×2+T121×4)/CC1) of a total length of the first periods T111 and T121 to the length of the chopping cluster CC1.

The heating pattern table will be described with reference to FIG. 4. In the heating pattern table, three or more heating patterns are determined. In the present embodiment, the heating pattern table determines four heating patterns, that is, a heating pattern of the first color, a heating pattern of the second color, a heating pattern of the mixed color, and a heating pattern of the base material color. The switching data specifies whether to set the first period to "ON" or "OFF". In the present embodiment, when the switching data indicates "1", the switching data specifies that the first period is set to "ON", and when the switching data indicates "0", the switching data specifies that the first period is set to "OFF". "ON" in the first period refers to a state (application state) in which the energization to the heat generating element R is maintained during the first period, and "OFF" in the first period refers to a state (non-application state) in which a stop of the energization to the heat generating element R is maintained during the first period. That is, the first period is a period in which "ON" and "OFF" are switched by the switching data.

The heating pattern indicates a combination of switching data for setting the first period to either "ON" or "OFF" for each chopping unit in the strobe signal STB. That is, the heating pattern indicates a combination of whether the switching data corresponding to the chopping unit CU11 indicates "1" or "0", the switching data corresponding to the chopping unit CU12 indicates "1" or "0", the switching data corresponding to the chopping unit CU21 indicates "1" or "0", and the switching data corresponding to the chopping unit CU22 indicates "1" or "0".

The switching data corresponding to the chopping unit CU11 is output at a timing of T1. Similarly, switching data corresponding to the chopping units CU12, CU21, and CU22 are output at timings T2, T3, and T4, respectively.

In the present embodiment, in the heating pattern of the first color, the switching data corresponding to the chopping unit CU11 indicates "1", the switching data corresponding to the chopping unit CU12 indicates "1", the switching data corresponding to the chopping unit CU21 indicates "0", and the switching data corresponding to the chopping unit CU22 indicates "0".

In the heating pattern of the second color, the switching data corresponding to the chopping units CU11, CU12, CU21, and CU22 indicates "0", "0", "1", and "1", respectively. In the heating pattern of the mixed color, the switching data corresponding to the chopping units CU11, CU12, CU21, and CU22 indicates "1", "1", "1", and "1", respectively. In the heating pattern of the base material color, the switching data corresponding to the chopping units CU11, CU12, CU21, and CU22 indicate "0", "0", "0", and "0", respectively.

Figure 5:
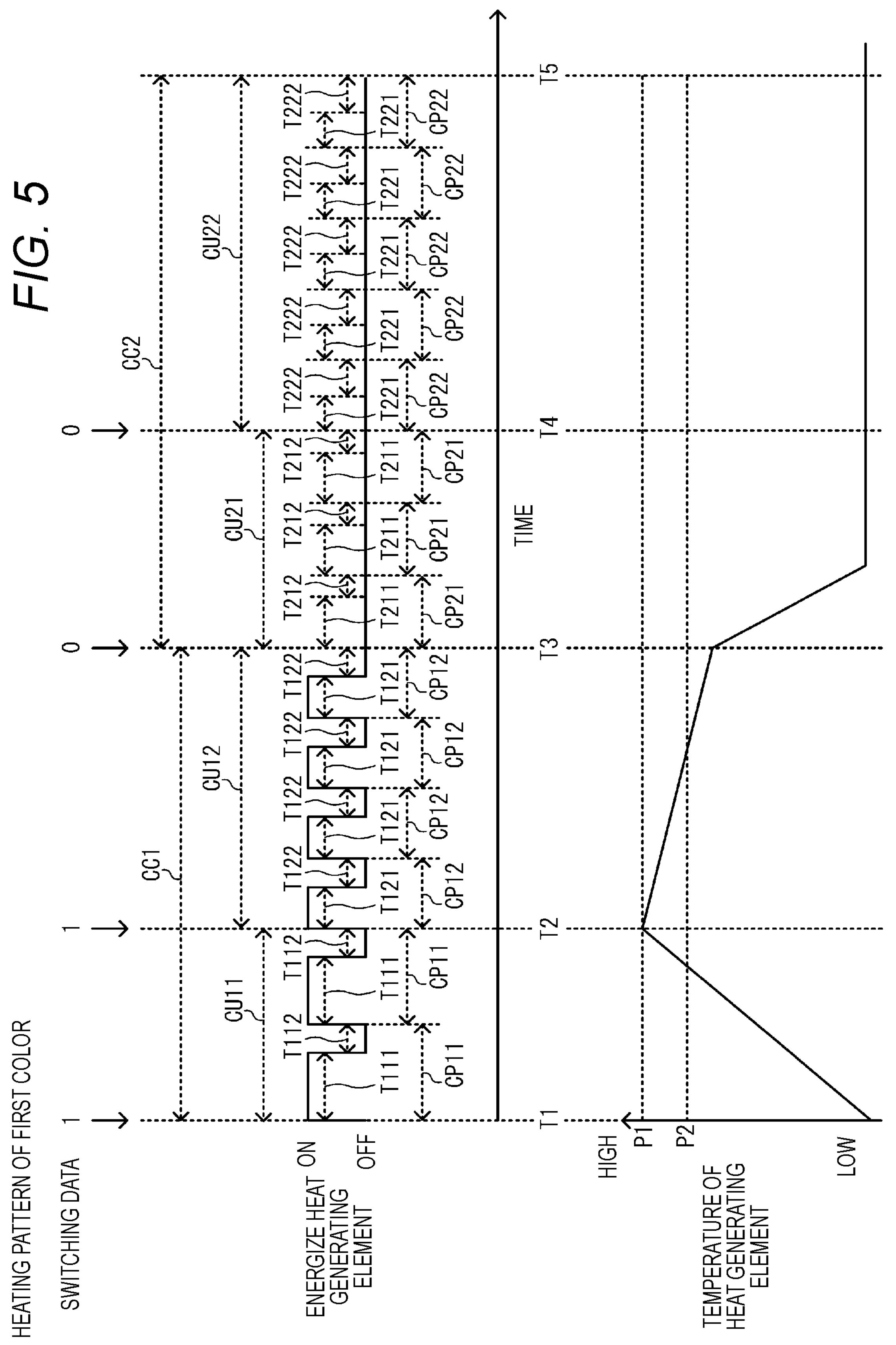
FIG. 5 is a diagram showing an energization mode and a temperature change of a heat generating element R in a case in which the heat generating element R is controlled in a heating pattern of a first color.
Figure 6:
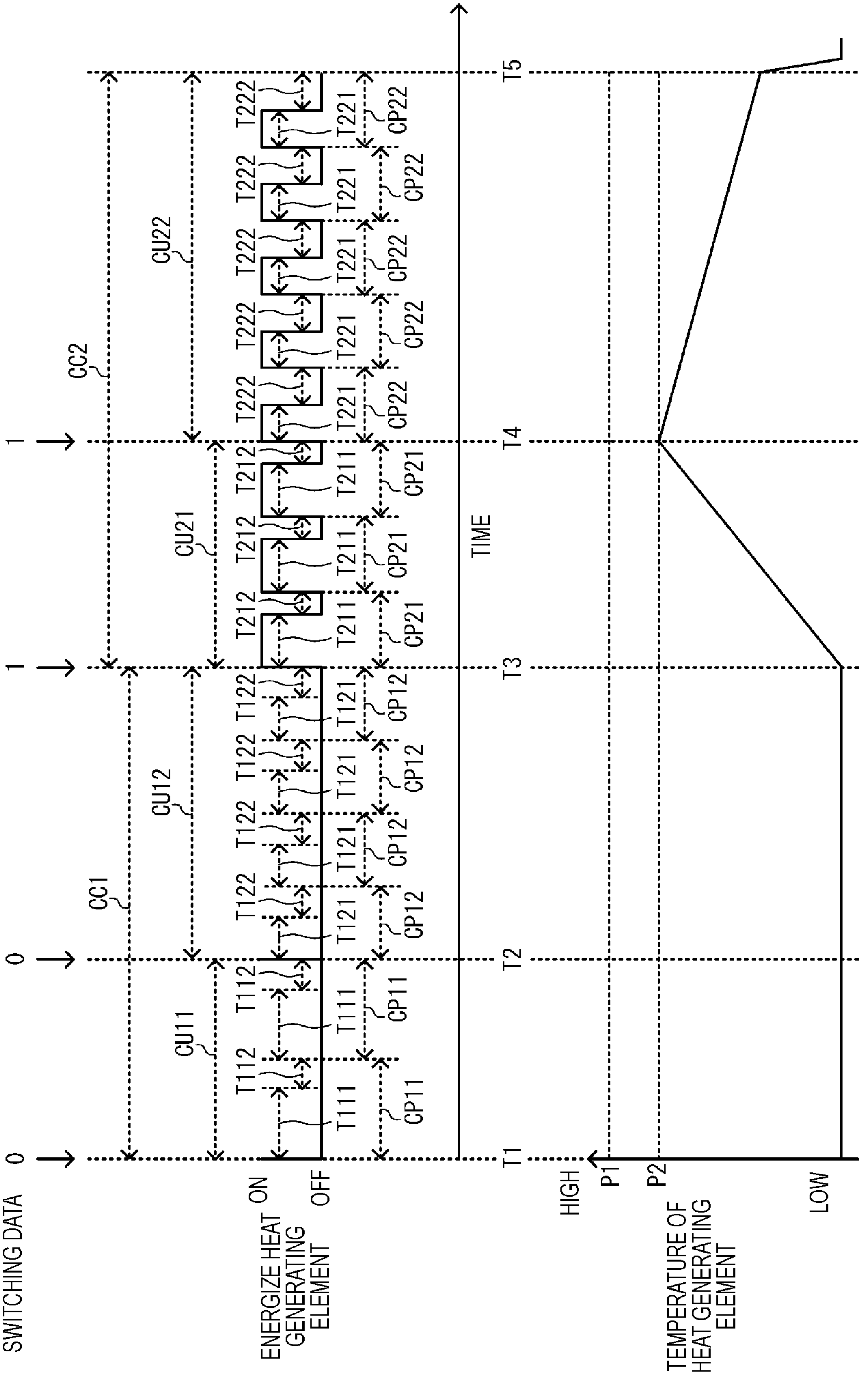
FIG. 6 is a diagram showing the energization mode and the temperature change of the heat generating element R in a case in which the heat generating element R is controlled in a heating pattern of a second color.
Figure 7:
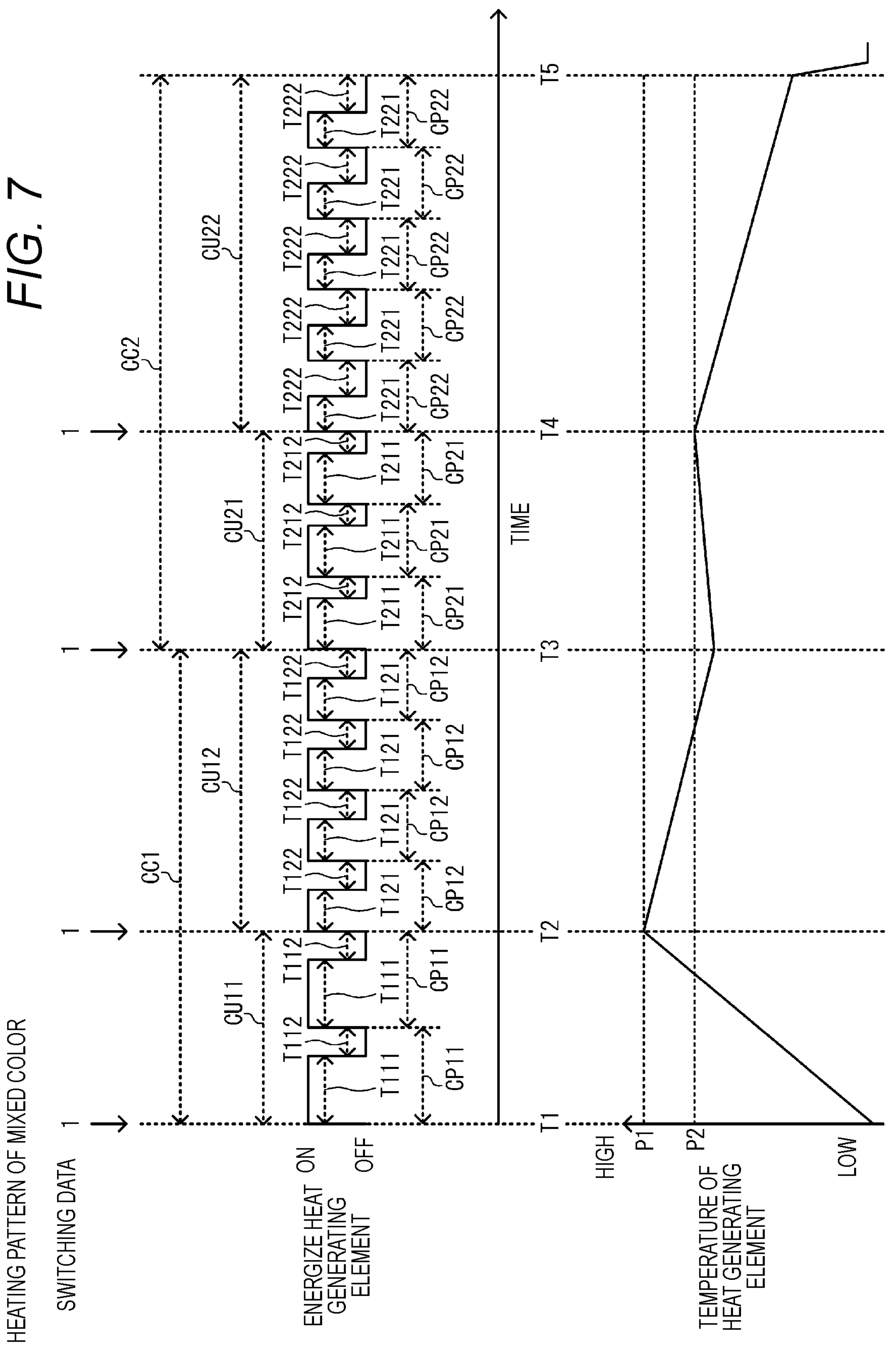
FIG. 7 is a diagram showing the energization mode and the temperature change of the heat generating element R in a case in which the heat generating element R is controlled in a heating pattern of a mixed color.

An energization mode of the heat generating element R according to the heating pattern will be described with reference to FIGS. 5 to 7. In the present embodiment, when the switching data indicates "1", each of the AND gates G(1) to G(n) energizes the corresponding heat generating element R in the first period of the strobe signal STB. When the switching data indicates "0", each of the AND gates G(1) to G(n) stops the energization of the corresponding heat generating element R in the first period of the strobe signal STB. Each of the AND gates G(1) to G(n) stops the energization of the corresponding heat generating element R in the second period of the strobe signal STB, regardless of the switching data. In FIGS. 5 to 7, the state in which the heat generating element R is energized is indicated by "ON", and the state in which the energization of the heat generating element R is stopped is indicated by "OFF".

As shown in FIG. 5, in the heating pattern of the first color, since the switching data at T1 indicates "1", the chopping cycle CP11 in which the first period T111 is "ON" is repeated twice in the chopping unit CUl 1. Therefore, in the chopping unit CU11, the energization to the heat generating element R is intermittently performed twice. Similarly, since the switching data at T2 indicates "1", the chopping cycle CP12 in which the first period T121 is "ON" is repeated four times in the chopping unit CU12. Therefore, in the chopping unit CU12, the energization to the heat generating element R is intermittently performed four times.

Since the switching data at T3 indicates "0", the chopping cycle CP21 in which the first period T211 is "OFF" is repeated three times in the chopping unit CU21. Therefore, in the chopping unit CU21, the energization to the heat generating element R is not performed. Similarly, since the switching data at T4 indicates "0", the chopping cycle CP22 in which the first period T221 is "OFF" is repeated five times in the chopping unit CU22. Therefore, in the chopping unit CU22, the energization to the heat generating element R is not performed.

According to this, since the first period T111 is longer than the first period T121, a temperature of the heat generating element R rises to a temperature P1 higher than the first temperature from T1 to T2, and thereafter, the temperature of the heat generating element R is maintained in a given range from T2 to T3. Since the heat generating element R is not heated after T3, the temperature of the heat generating element R decreases so as to approach a temperature of an atmosphere in the printer 1. Therefore, the heat generating element R heats the heat sensitive tape 9 at a temperature higher than the first temperature during a first heating time (T1 to T3). Accordingly, first energy is applied from the heat generating element R to the first color developing layer 921.

When the first energy is applied to the first color developing layer 921, the temperature of the first color developing layer 921 exceeds the first temperature. Accordingly, the first color developing layer 921 develops the first color. The second color developing layer 922 does not reach the second temperature due to a temperature gradient or the like even when the heat sensitive tape 9 is heated at the temperature higher than the first temperature during the first heating time (T1 to T3). Therefore, in the heating pattern of the first color, only the first color developing layer 921 of the plurality of color developing layers 92 develops the color.

As shown in FIG. 6, in the heating pattern of the second color, since the switching data at T1 indicates "0", the chopping cycle CP11 in which the first period T111 is "OFF"

is repeated twice in the chopping unit CUl 1. Therefore, in the chopping unit CU11, the energization to the heat generating element R is not performed. Similarly, since the switching data at T2 indicates "0", the chopping cycle CP12 in which the first period T121 is "OFF" is repeated four times in the chopping unit CU12. Therefore, in the chopping unit CU12, the energization to the heat generating element R is not performed.

Since the switching data at T3 indicates "1", the chopping cycle CP21 in which the first period T211 is "ON" is repeated three times in the chopping unit CU21. Therefore, in the chopping unit CU21, the energization to the heat generating element R is intermittently performed three times. Similarly, since the switching data at T4 indicates "1", the chopping cycle CP22 in which the first period T221 is "ON" is repeated five times in the chopping unit CU22. Therefore, in the chopping unit CU22, the energization to the heat generating element R is intermittently performed five times.

According to this, since the heat generating element R is not heated from T1 to T3, the temperature of the heat generating element R is maintained at an unheated temperature. Since the first period T211 is longer than the first period T221, the temperature of the heat generating element R rises to a temperature P2 higher than the second temperature from T3 to T4, and thereafter, the temperature of the heat generating element R is maintained in a given range from T4 to T5. Therefore, the heat generating element R heats the heat sensitive tape 9 at a temperature higher than the second temperature during a second heating time (T3 to T5). Since the length of the first period T211 is smaller than the length of the first period T111, the temperature P2 is lower than the temperature P1.

By heating the heat sensitive tape 9 by the heat generating element R, second energy is applied from the heat generating element R to the second color developing layer 922. Unlike the first energy, the second energy is larger than the first energy in the present embodiment. When the second energy is applied to the second color developing layer 922, the temperature of the second color developing layer 922 exceeds the second temperature. Accordingly, the second color developing layer 922 develops the second color. In the heating pattern of the second color, only the second color developing layer 922 of the plurality of color developing layers 92 develops the color.

As shown in FIG. 7, in the heating pattern of the mixed color, since the switching data at T1 indicates "1", the chopping cycle CP11 in which the first period T111 is "ON" is repeated twice in the chopping unit CUl 1. Therefore, in the chopping unit CU11, the energization to the heat generating element R is intermittently performed twice. Similarly, since the switching data at T2 indicates "1", the chopping cycle CP12 in which the first period T121 is "ON" is repeated four times in the chopping unit CU12. Therefore, in the chopping unit CU12, the energization to the heat generating element R is intermittently performed four times.

Since the switching data at T3 indicates "1", the chopping cycle CP21 in which the first period T211 is "ON" is repeated three times in the chopping unit CU21. Therefore, in the chopping unit CU21, the energization to the heat generating element R is intermittently performed three times. Similarly, since the switching data at T4 indicates "1", the chopping cycle CP22 in which the first period T221 is "ON" is repeated five times in the chopping unit CU22. Therefore, in the chopping unit CU22, the energization to the heat generating element R is intermittently performed five times.

According to this, the temperature of the heat generating element R rises from T1 to T2, and thereafter, the temperature of the heat generating element R is maintained within a given range from T2 to T3. Therefore, the heat generating element R heats the heat sensitive tape 9 at a temperature higher than the first temperature during the first heating time (T1 to T3). Accordingly, the first energy is applied from the heat generating element R to the first color developing layer 921. When the first energy is applied to the first color developing layer 921, the temperature of the first color developing layer 921 exceeds the first temperature. Accordingly, the first color developing layer 921 develops the first color.

Further, the temperature of the heat generating element R rises again from T3 to T4, and thereafter, the temperature of the heat generating element R is maintained within a given range from T4 to T5. Therefore, the heat generating element R heats the heat sensitive tape 9 at a temperature higher than the second temperature during the second heating time (T3 to T5). Accordingly, the second energy is applied from the heat generating element R to the second color developing layer 922. When the second energy is applied to the second color developing layer 922, the temperature of the second color developing layer 922 exceeds the second temperature. Accordingly, the second color developing layer 922 develops the second color.

Although not shown, in the heating pattern of the base material color, since all of the switching data at T1, T2, T3, and T4 indicate "0", the energization to the heat generating element R is not performed in any of the chopping units CU11, CU12, CU21, and CU22. Accordingly, none of the plurality of color developing layers 92 develops a color. That is, the heating pattern of the base material color means a heating pattern (pattern in which the heat generating element R does not generate the heat) in which the printing of the dots on the heat sensitive tape 9 is not performed.

Furthermore, in the application of the energy which causes the first color developing layer 921 to develop the color, the first periods T111 and T121 of the chopping cluster CC1 of the chopping clusters CC1 and CC2 are used, and the first periods T211 and T221 of the chopping cluster CC2 are not used (see FIGS. 5 and 7). In the application of the energy which causes the second color developing layer 922 to develop the color, the first periods T211 and T221 of the chopping cluster CC2 of the chopping clusters CC1 and CC2 are used, and the first periods T111 and T121 of the chopping cluster CC1 are not used (see FIGS. 6 and 7).

In order to facilitate understanding, FIGS. 5 to 7 simply show a temperature change of the heat generating element R with time in a linear manner, but an actual temperature change of the heat generating element R with time is nonlinear. In practice, when the heating to the heat generating element R is started, the temperature of the heat generating element R increases such that a temperature change rate gradually decreases as time elapses from the start of the heating. When the heating to the heat generating element R is stopped, the temperature of the heat generating element R decreases such that the temperature change rate gradually decreases as time elapses from the stop of the heating. A time required for the temperature of the heat generating element R to decrease from the stop of the heating is determined by, for example, performance of a heat sink (not shown) provided in the thermal head 5.

Figure 8:
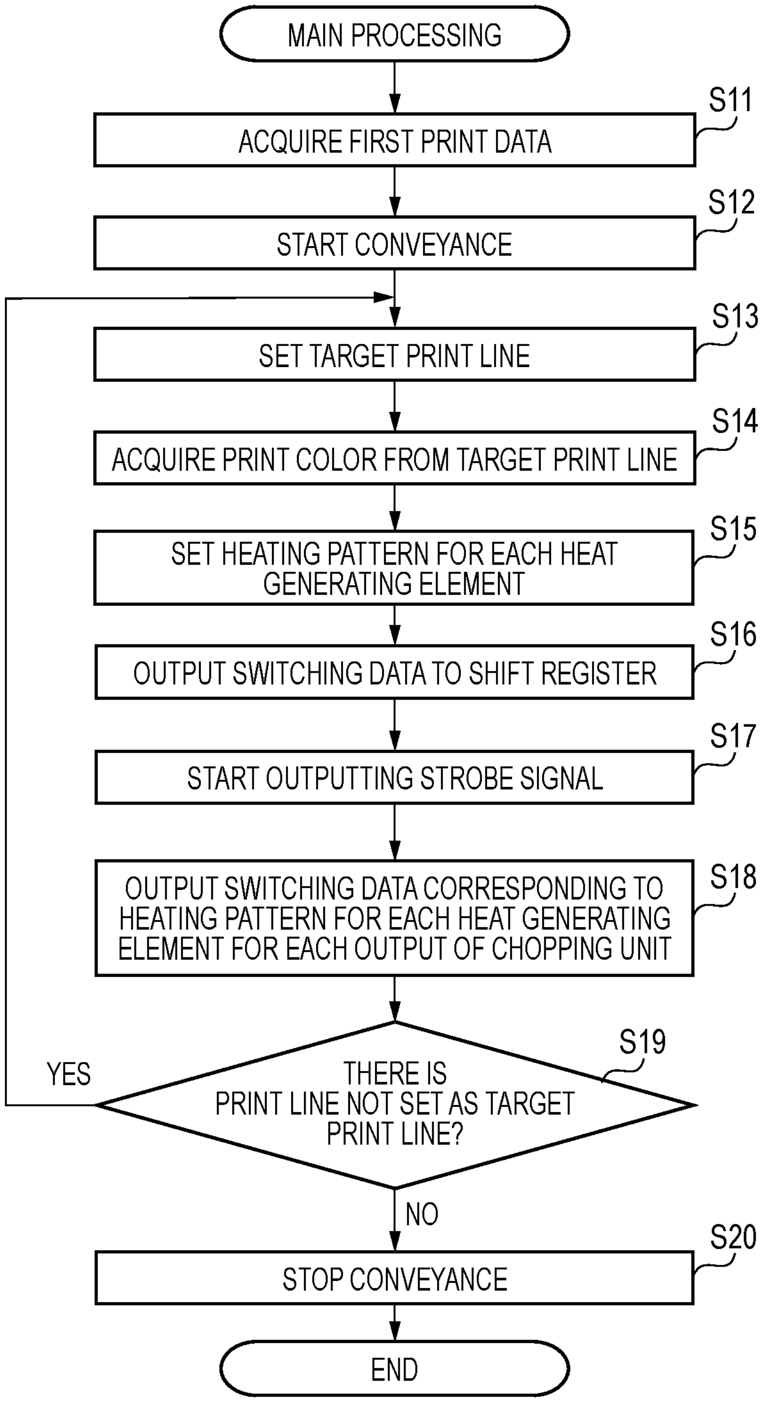
FIG. 8 is a flowchart of a main process.

The main process will be described with reference to FIG. 8. The user mounts the heat sensitive tape 9 (tape cassette in the present embodiment) in the mounting portion (not shown), and turns on the printer 1. The user operates the external terminal or the operation switches 4 to input a print start instruction to the printer 1. When the CPU 21 acquires the print start instruction, the CPU 21 reads a program from the flash memory 24 and executes the main process. The print start instruction specifies image data of a print target. In the main process, the printing and the like on the heat sensitive tape 9 based on the image data is controlled.

When the main process is started, the CPU 21 acquires the image data of the print target specified by the print start instruction from the external terminal via the communication unit 25, or acquires the image data from the flash memory 24 (S11).

The CPU 21 starts driving the conveyance motor 61 (see FIG. 2) (S12). Accordingly, the conveyance of the heat sensitive tape 9 performed by the platen roller 6 is started. The CPU 21 sets a target print line among the plurality of print lines in the image data acquired in the process of S11 (S13). The target print line is a print line to be controlled in subsequent process. In the process of S13, the CPU 21 sets the print line as the target print line in an order of printing.

The CPU 21 acquires the color corresponding to each of the plurality of dots in the target print line in association with the respective one of the plurality of dots (S14). The plurality of dots correspond to the plurality of heat generating elements R(1) to R(n), respectively. Therefore, each color to be printed is associated with the respective one of the plurality of heat generating elements R(1) to R(n) by the process of S14.

The CPU 21 sets heating patterns respectively corresponding the plurality of heat generating elements R(1) to R(n) for the heat generating elements R(1) to R(n) (S15). Specifically, the CPU 21 refers to the heating pattern table, and specifies, for the target heat generating element R, a heating pattern of a color corresponding to the target heat generating element R, which is the color acquired in the process of S14. The CPU 21 sets the specified heating pattern for the target heat generating element R. For example, when the first color corresponds to the heat generating element R(1), the CPU 21 sets the heating pattern of the first color for the heat generating element R(1).

The CPU 21 outputs, to the shift register 511, a plurality of pieces of switching data corresponding to the heating patterns set for each of the plurality of heat generating elements R(1) to R(n) in the process of S15 as the serial data via the signal line 21A (S16). For example, when the first color corresponds to the heat generating element R(1) and the heat generating element R(2) corresponds to the second color, the CPU 21 outputs, to the shift register 511, the switching data indicating "1" as the switching data at T1 corresponding to the heating pattern of the first color for the heat generating element R(1), and outputs, to the shift register 511, the switching data indicating "0" as the switching data at T1 corresponding to the heating pattern of the second color.

The shift register 511 converts the received serial data into the parallel data and associates the parallel data with the plurality of heat generating elements R(1) to R(n). In the process of S16, the CPU 21 outputs the switching data at T1 for each of the plurality of heat generating elements R(1) to R(n), and then sequentially outputs the switching data at T2, T3, and T4.

The CPU 21 starts outputting the strobe signal STB (S17). The strobe signal STB is input to each of the AND gates G(1) to G(n) via the signal line 21C. The CPU 21 outputs, from the shift register 511, the plurality of pieces of switching data converted into the parallel data in the shift register 511 and associated with the plurality of heat generating elements R(1) to R(n) to the plurality of corresponding AND gates G(1) to G(n) via the latch circuit 512 (S18). In the process of S18, the CPU 21 outputs the switching data for each output of the chopping unit (that is, at each timing of T1, T2, T3, and T4) in the strobe signal STB output by the process of S17.

For example, when the first color corresponds to the heat generating element R(1), the CPU 21 outputs the strobe signal STB in the process of S17. In the process of S18, the CPU 21 outputs the switching data indicating "1" to the AND gate G(1) at the timing of T1. In the process of S18, the CPU 21 outputs the switching data indicating "1" to the AND gate G(1) at the timing of T2. In the process of S18, the CPU 21 outputs the switching data indicating "0" to the AND gate G(1) at the timing of T3. In the process of S18, the CPU 21 outputs the switching data indicating "0" to the AND gate G(1) at the timing of T4. Accordingly, the heat generating element R(1) generates the heat between T1 and T2, causes the first color developing layer 921 to develop the first color, and prints a dot of the first color on the heat sensitive tape 9. Similarly, the heat generating elements R(2) to R(n) also print dots of the corresponding colors on the heat sensitive tape 9, respectively. Accordingly, one print line is printed on the heat sensitive tape 9.

The CPU 21 determines whether there is a print line that is not set as the target print line among the plurality of print lines in the image data acquired in the process of S11 (S19). If there is a print line that is not set as the target print line (S19: YES), the CPU 21 returns the process to S13. When there is no print line that is not set as the target print line (S19: NO), the CPU 21 stops driving the conveyance motor 61 since all of the plurality of print lines are printed on the heat sensitive tape 9 in the image data (S20). Accordingly, the conveyance of the heat sensitive tape 9 performed by the platen roller 6 is stopped. The CPU 21 ends the main process.

As described above, the application control is performed by the combination of the strobe signal STB and the switching data. Since the chopping units are arranged over time in the strobe signal STB, the application state and the non-application state are switched between the output of one switching data and the output of the next switching data. For example, in the heating pattern of the first color, between the switching data at T1 and the switching data at T2, the chopping cycle CP11 including the first period T111 in the application state and the second period T112 in the non-application state are repeated twice. Therefore, responsiveness of the heat generation of the heat generating element R is improved as compared with a case in which the application state and the non-application state are switched each time the switching data is output. That is, the printer 1 contributes to an advantage of improving the responsiveness of the heat generating element R without shortening an output interval of the switching data, for example, by outputting the switching data at each of an end of the first period and an end of the second period. Accordingly, the printer 1 contributes to an advantage of preventing a variation in size of the dot actually printed on the heat sensitive tape 9 with respect to a target size while preventing a control load of the CPU 21.

The heating pattern table determines the heating pattern of the first color for applying the first energy to the first color developing layer 921 and the heating pattern of the second color for applying the second energy to the second color developing layer 922. According to this, when the application control is performed based on the heating pattern of the first color, the dot of the first color is printed on the heat sensitive tape 9. When the application control is performed based on the heating pattern of the second color, the dot of the second color is printed on the heat sensitive tape 9. Accordingly, the printer 1 contributes to an advantage of separately printing the dots of the colors printed on the heat sensitive tape 9 while preventing the control load of the CPU 21.

The strobe signal STB includes the chopping cluster CC1. The chopping cluster CC1 is the plurality of chopping units CU11 and CU12 in which the ratios of the lengths of the first periods to the lengths of the respective chopping cycles are arranged in the descending order over time in the application control (one printing cycle). According to this, in the chopping cluster CC1, as the order in which the chopping units CU11 and CU12 are arranged becomes later over time, a peak of the temperature of the heat generating element R in the case in which the energy is applied to the heat generating element R by the chopping unit CU12 becomes lower than that in the case in which the energy is applied to the heat generating element R by the chopping unit CUl 1. Therefore, the printer 1 contributes to an advantage of preventing an influence of heat storage of the heat generating element R caused by the chopping cluster CC1 on the control performed by the chopping unit CU21 next to the chopping cluster CC1. Accordingly, the printer 1 contributes to an advantage of further preventing the size of the dot actually printed on the heat sensitive tape 9 from varying with respect to the target size. The chopping cluster CC2 also contributes to the same advantages as those of the chopping cluster CC1.

The strobe signal STB includes the chopping cluster CC1. The chopping cluster CC1 is the plurality of chopping units CU11 and CU12 in which the lengths of the chopping units are arranged in the ascending order over time in the application control (one printing cycle). According to this, in the chopping cluster CC1, as the order in which the chopping units are arranged becomes later over time, the peak of the temperature of the heat generating element R in the case in which the energy is applied to the heat generating element R by the chopping unit CU12 becomes lower than that in the case in which the energy is applied to the heat generating element R by the chopping unit CU11. Therefore, the printer 1 contributes to an advantage of preventing an influence of heat storage of the heat generating element R caused by the chopping cluster CC1 on the control performed by the chopping unit CU21 next to the chopping cluster CC1. Accordingly, the printer 1 contributes to an advantage of further preventing the size of the dot actually printed on the heat sensitive tape 9 from varying with respect to the target size. The chopping cluster CC2 also contributes to the same advantages as those of the chopping cluster CC1.

In the above embodiment, the heat sensitive tape 9 corresponds to a "heat sensitive medium". The platen roller 6 corresponds to a "conveyance unit". The CPU 21 that executes S11 to S19 corresponds to a "controller". The ROM 22 corresponds to a "storage unit". The CPU 21 that executes S17 corresponds to a "first output unit". The CPU 21 that executes S18 corresponds to a "second output unit". The first color developing layer 921 corresponds to a "first layer". The second color developing layer 922 corresponds to a "second layer". The heating pattern of the first color corresponds to a "first heating pattern". The heating pattern of the second color corresponds to a "second heating pattern".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

The present invention may be variously modified from the above embodiment. For example, the printer 1 may print on, for example, a heat sensitive paper in place of the heat sensitive tape 9 as the heat sensitive medium. That is, the heat sensitive medium may not be long. The heat sensitive tape 9 may not include one or both of the release paper 90 and the overcoat layer 93.

In the embodiment described above, the plurality of color developing layers 92 are formed by the two color developing layers 92, that is, the first color developing layer 921 and the second color developing layer 922. On the other hand, the heat sensitive tape 9 may include one color developing layer 92 or three or more color developing layers 92.

In the above-described embodiment, the heating pattern table may be stored in the flash memory 24. In the heating pattern table, three or more heating patterns may be determined. Therefore, in the heating pattern table, for example, the heating pattern of the mixed color may not be determined. In this case, when a dot of a mixed color is to be printed, the CPU 21 may generate the heating pattern of the mixed color based on the heating pattern of the first color and the heating pattern of the second color. When the plurality of color developing layers 92 include three or more color developing layers 92, the heating pattern table may determine the number of heating patterns corresponding to the number of the color developing layers 92, or may determine the number of heating patterns obtained by adding the number of the mixed color that may be expressed to the number of color developing layers 92.

For example, when the heat sensitive tape 9 includes one color developing layer 92, at least two of the three or more heating patterns may be heating patterns for printing dots having different sizes on the heat sensitive tape 9. For example, as shown in FIG. 9, in addition to the heating pattern of the base material color, the heating pattern table may determine a heating pattern of a first size for printing a dot having the first size on the heat sensitive tape 9 and a heating pattern of a second size for printing a dot having a second size different from the first size on the heat sensitive tape 9.

In this case, the printer 1 contributes to an advantage of separately printing the dots having the sizes printed on the heat sensitive tape 9 while preventing the control load of the CPU 21. The heating pattern table may further determine heating patterns for printing dots having three or more different sizes on the heat sensitive tape 9. When the heat sensitive tape 9 includes the plurality of color developing layers 92, the heating pattern table may determine heating patterns for printing, on the heat sensitive tape 9, dots having different sizes for the same color or different colors.

In the above embodiment, the number of (two) chopping clusters is the same as the number of (two) color developing layers 92. On the other hand, the number of chopping clusters may be smaller or larger than the number of the plurality of color developing layers 92.

In the above embodiment, the chopping cluster CC2 is used and the chopping cluster CC1 is not used for applying the energy to cause the second color developing layer 922 to develop the color. On the other hand, the chopping cluster CC1 may be used for applying the energy to cause the second color developing layer 922 to develop the color. The chopping cluster CC2 may not be used for applying the energy to cause the second color developing layer 922 to develop the color. Both the chopping clusters CC1 and CC2 may be used for applying the energy to cause the second color developing layer 922 to develop the color. As an example in which both the chopping clusters CC1 and CC2 are used for applying the energy to cause the second color developing layer 922 to develop the color, in the heating pattern of the second color, the switching data at T1, T2, T3, and T4 may indicate "0", "1", "0", and "1", respectively. The heating pattern of the first color may be changed in the same manner.

The number of times the chopping unit is repeated in the strobe signal STB is not limited to 4 times, and may be 2 times or 5 times or more as long as the number of times is a plurality of times. In this case, the heating pattern table may preferably determine a combination of the number of switching data corresponding to the number of repetitions of the chopping unit for each heating pattern. For example, when the number of repetitions of the chopping unit is three, the heating pattern table may preferably determine a combination of the three switching data for each heating pattern. A configuration of the chopping unit to be repeated may be the same as or different from each other.

In the above embodiment, in the strobe signal STB, the chopping unit may be formed by repeating the chopping cycle once, that is, by one chopping cycle. For example, the chopping unit CU11 may be formed by repeating the chopping cycle CP11 once.

In the above embodiment, the strobe signal STB may include the plurality of chopping units in which the ratios of the lengths of the first periods to the lengths of the respective chopping cycles are arranged in the descending order over time and the lengths of the chopping units are arranged in the descending order over time. For example, the ratio (T121/CP12) of the length of the first period T121 to the length of the chopping cycle CP12 may be smaller than the ratio (T111/CP11) of the length of the first period T111 to the length of the chopping cycle CP11, and the length (length from T2 to T3) of the chopping unit CU12 may be smaller than the length (length from T1 to T2) of the chopping unit CUl 1.

The strobe signal STB may include the plurality of chopping units in which the ratios of the lengths of the first periods to the lengths of the respective chopping cycles are arranged in the ascending order over time and the lengths of the chopping units are arranged in the ascending order over time. For example, the ratio (T121/CP12) of the length of the first period T121 to the length of the chopping cycle CP12 may be larger than the ratio (T111/CP11) of the length of the first period T111 to the length of the chopping cycle CP11, and the length (length from T2 to T3) of the chopping unit CU12 may be smaller than the length (length from T1 to T2) of the chopping unit CUl 1.

The ratio (T121/CP12) of the length of the first period T121 to the length of the chopping cycle CP12 may be the same as the ratio (T111/CP11) of the length of the first period T111 to the length of the chopping cycle CP11. The length (length from T2 to T3) of the chopping unit CU12 may be the same as the length (length from T1 to T2) of the chopping unit Cull.

In the above embodiment, the length of the first period T211 may be larger than or the same as the length of the first period T111. The length of the first period T221 may be smaller than or the same as the length of the first period T121. The length of the chopping unit CU21 may be smaller than or the same as the length of the chopping unit CUl 1. The length of the chopping unit CU22 may be smaller than or the same as the length of the chopping unit CU12. The length of the chopping cluster CC2 may be smaller than or the same as the length of the chopping cluster CC1. The ratio ((T211×3+T221×5)/CC2) of the total length of the first periods T211 and T221 to the length of the chopping cluster CC2 may be larger than or the same as the ratio ((T111×2+T121×4)/CC1) of the total length of the first periods T111 and T121 to the length of the chopping cluster CC1.

In the above embodiment, the printer 1 may convey the heat sensitive tape 9 by a roller or the like different from the platen roller 6 in place of the platen roller 6 or in addition to the platen roller 6.

Instead of the CPU 21, a microcomputer, an application specific integrated circuits (ASIC), a field programmable gate array (FPGA), or the like may be used as the processor. The main process may be distributed by a plurality of processors. The non-transitory storage medium such as the ROM 22 and the flash memory 24 may be any storage medium that may retain information regardless of a period during which the information is stored. The non-transitory storage medium may not include a transitory storage medium (for example, a signal to be transmitted). For example, the program may be downloaded from a server connected to a network (not shown) (that is, transmitted as a transmission signal), and may be stored in the ROM 22 or the flash memory 24. In this case, the program may be stored in the non-transitory storage medium such as an HDD provided in the server.

What is claimed is:

1. A printer comprising:

a conveyance unit configured to convey a heat sensitive medium in a conveyance direction;

a thermal head including a plurality of heat generating elements arranged in a direction crossing the conveyance direction, and configured to perform printing on the heat sensitive medium conveyed by the conveyance unit by heat generation of the plurality of heat generating elements;

a controller configured to selectively cause the plurality of heat generating elements to generate heat by performing, for each of the heat generating elements, application control of energy to the heat generating element so as to print a dot on the heat sensitive medium by the heat generating elements; and a storage unit configured to store three or more heating patterns of the heat generating elements in the application control, wherein the controller includes a first output unit configured to output, in the application control, a strobe signal in which a plurality of chopping units formed by repeating a given chopping cycle are arranged over time, the chopping cycle including a first period during which an application state in which the energy is applied to the heat generating element or a non-application state in which the energy is not applied to the heat generating element is set, and a second period during which the non-application state is set, and a second output unit configured to output switching data corresponding to each of the plurality of heat generating elements for each of the chopping units in the strobe signal output by the first output unit in the application control, the switching data specifying, for each of the chopping units, whether to set the first period to the application state or the non-application state, the heating pattern indicates, for one of the heat generating elements, a combination of the switching data which is to be output by the second output unit and respectively set the first periods to the application state or the non-application state, for each of the plurality of chopping units in the strobe signal output by the first output unit in the application control, and the second output unit outputs, based on image data, the switching data corresponding to one of the three or more heating patterns stored in the storage unit for each of the plurality of heat generating elements.

2. The printer according to claim 1, wherein the heat sensitive medium includes a first layer configured to turn a first color when first energy is applied to the heat sensitive medium, and a second layer configured to turn a second color different from the first color when second energy different from the first energy is applied to the heat sensitive medium, and the storage unit is configured to store, as two of the three or more heating patterns, a first heating pattern for applying the first energy to the first layer, and a second heating pattern for applying the second energy to the second layer.

3. The printer according to claim 1, wherein the storage unit configured to store, as two of the three or more heating patterns, a first heating pattern for printing the dot having a first size on the heat sensitive medium, and a second heating pattern for printing the dot having a second size different from the first size on the heat sensitive medium.

4. The printer according to claim 1, wherein in the application control, the first output unit outputs the strobe signal including a chopping cluster in which the plurality of chopping units are arranged over time in a descending order of ratios of lengths of the first periods to lengths of the chopping cycles.

5. The printer according to claim 1, wherein in the application control, the first output unit outputs the strobe signal including a chopping cluster in which the plurality of chopping units are arranged over time in an ascending order of lengths of the chopping units.

6. The printer according to claim 1, wherein the plurality of heat generating elements are arranged in an orthogonal direction to the conveyance direction.

7. A printing method performed by a printer including a conveyance unit configured to convey a heat sensitive medium in a conveyance direction, a thermal head including a plurality of heat generating elements arranged in a direction crossing the conveyance direction, and configured to perform printing on the heat sensitive medium conveyed by the conveyance unit by heat generation of the plurality of heat generating elements, and a storage unit configured to store three or more heating patterns of the heat generating elements in application control of energy to the heat generating elements for printing a dot on the heat sensitive medium by the heat generating elements, the method comprising:

selectively causing the plurality of heat generating elements to generate heat by performing the application control for each of the heat generating elements, wherein the causing includes outputting a strobe signal in which a plurality of chopping units formed by repeating a given chopping cycle are arranged over time in the application control, the chopping cycle including a first period during which an application state in which the energy is applied to the heat generating element or a non-application state in which the energy is not applied to the heat generating element is set, and a second period during which the non-application state is set, and further outputting switching data corresponding to each of the plurality of heat generating elements for each of the chopping units in the strobe signal output by the other outputting in the application control, the switching data specifying, for each of the chopping units, whether to set the first period to the application state or the non-application state, the heating pattern indicates, for one of the heat generating elements, a combination of the switching data which is to be output by the further outputting and respectively set the first periods to the application state or the non-application state, for each of the plurality of chopping units in the strobe signal output by the other outputting in the application control, and the second output process outputs, based on image data, the switching data corresponding to one of the three or more heating patterns stored in the storage unit for each of the plurality of heat generating elements.

8. A non-transitory computer readable medium storing a program causing a computer of a printer to execute a process, the printer including a conveyance unit configured to convey a heat sensitive medium in a conveyance direction, a thermal head including a plurality of heat generating elements arranged in a direction crossing the conveyance direction, and configured to perform printing on the heat sensitive medium conveyed by the conveyance unit by heat generation of the plurality of heat generating elements, and a storage unit configured to store three or more heating patterns of the heat generating elements in application control of energy to the heat generating elements for printing a dot on the heat sensitive medium by the heat generating elements, the process comprising:

selectively causing the plurality of heat generating elements to generate heat by performing the application control for each of the heat generating elements, wherein the causing includes outputting a strobe signal in which a plurality of chopping units formed by repeating a given chopping cycle are arranged over time in the application control, the chopping cycle including a first period during which an application state in which the energy is applied to the heat generating element or a non-application state in which the energy is not applied to the heat generating element is set, and a second period during which the non-application state is set, and further outputting switching data corresponding to each of the plurality of heat generating elements for each of the chopping units in the strobe signal output by the other outputting in the application control, the switching data specifying, for each of the chopping units, whether to set the first period to the application state or the non-application state, the heating pattern indicates, for one of the heat generating elements, a combination of the switching data which is to be output by the further outputting and respectively set the first periods to the application state or the non-application state, for each of the plurality of chopping units in the strobe signal output by the other outputting in the application control, and the second output process outputs, based on image data, the switching data corresponding to one of the three or more heating patterns stored in the storage unit for each of the plurality of heat generating elements.

* * * * *